United States Patent
Yu

(10) Patent No.: US 6,907,537 B2
(45) Date of Patent: Jun. 14, 2005

(54) FREQUENCY DIVISION TYPE DEVICE FOR PROTECTING A PORTABLE INFORMATION PROCESSING SYSTEM FROM DATA LOSS WHEN THE SYSTEM EXPERIENCES UNUSUAL VOLTAGES

(75) Inventor: William Yu, Taipei (TW)

(73) Assignee: Inventec Corporation, Taipei (TW)

( * ) Notice: Subject to any disclaimer, the term of this patent is extended or adjusted under 35 U.S.C. 154(b) by 757 days.

(21) Appl. No.: 09/899,944

(22) Filed: Jul. 9, 2001

(65) Prior Publication Data

US 2003/0009704 A1 Jan. 9, 2003

(51) Int. Cl.[7] .............................................. G06F 1/30
(52) U.S. Cl. ...................................... 713/340; 713/300
(58) Field of Search ............................... 713/300, 310, 713/340; 310/357; 307/43

(56) References Cited

U.S. PATENT DOCUMENTS 4,703,191 A * 10/1987 Ferguson .................... 307/64
6,172,447 B1 * 1/2001 Ishikawa et al. ............ 310/359
6,342,752 B1 * 1/2002 Kataoka et al. ............. 310/357

\* cited by examiner

*Primary Examiner*—Lynne H. Browne
*Assistant Examiner*—Paul Yanchus, III
(74) *Attorney, Agent, or Firm*—Birch, Stewart, Kolasch & Birch, LLP

(57) ABSTRACT

This specification discloses a frequency division type protection device for portable information processing systems. It is composed of a control unit, a piezoelectric unit, a frequency division unit and a display unit. When a portable information processing system experience an unusual voltage, the frequency division unit produces and sends a frequency division voltage to the control to provide its work voltage. The piezoelectric unit temporarily stops its job and the display unit shows the current status of the protection device. The invention can thus protect the portable information system and the data stored therein.

10 Claims, 4 Drawing Sheets

FREQUENCY DIVISION TYPE DEVICE FOR PROTECTING A PORTABLE INFORMATION PROCESSING SYSTEM FROM DATA LOSS WHEN THE SYSTEM EXPERIENCES UNUSUAL VOLTAGES

BACKGROUND OF THE INVENTION

1. Field of Invention

The invention relates to a frequency division type protection device and, in particular, to a frequency division type protection device for portable information processing systems.

2. Related Art

As information technology prospers, people have more chances to encounter electronic devices. In particular, the modern society relies a lot upon computer uses. Computers are widely used in government bureaus, enterprise systems, homes and individuals. To facilitate and increase work or research efficiency, more and more people start to use portable computers with which users can process works at hand. They can be further used as notebooks, to receive or send electronic mail. When the user travels, a portable computer can allow the user to do all sorts of works to gain the optimal efficiency.

Nevertheless, portable computers often crash during uses. When this happens, the user has to turn off the computer and restart the system. Unsaved information would be lost and the user has to wait a while for the system to reboot. Currently available portable computers usually have an inverter protection circuit to determine whether the power supply functions normally. If there is any abnormal activity in the power supply, it immediately shuts down the portable computer, stopping the job of the LCM (Liquid Crystal Display Module). Again, the user has to reboot the system in this case. However, it is often the case that the circuit makes incorrect judgment or experience some noises and shuts down the LCM, resulting in the portable computer's unable to function correctly.

Obviously, the drawback of the conventional portable computers is that the inverter uses voltages for comparison. Therefore, the portable computer is often shut down in correctly due to circuit misjudgments or noise interference. It is an interesting question how to solve the above issues.

SUMMARY OF THE INVENTION

Thus, the invention provides a frequency division type protection device for portable information processing systems. Its objective is to prevent data loss due to temporary system breakdown when there is any abnormal voltage activity occurring to the portable information processing system.

The invention is comprised of a control unit, a piezoelectric unit, a frequency division unit, and a display unit. When the portable information processing system experiences abnormal voltage changes, the frequency division unit provides the control unit the necessary work voltage to prevent the system data losses and, at the same time, temporarily disables the piezoelectric unit. The display unit shows the current status of the protection device. When the disorder of the portable information processing system is solved and the voltage restores, the frequency division unit stops its frequency division task and puts the piezoelectric unit back to function. This then achieves the objective of protecting the portable information processing system.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
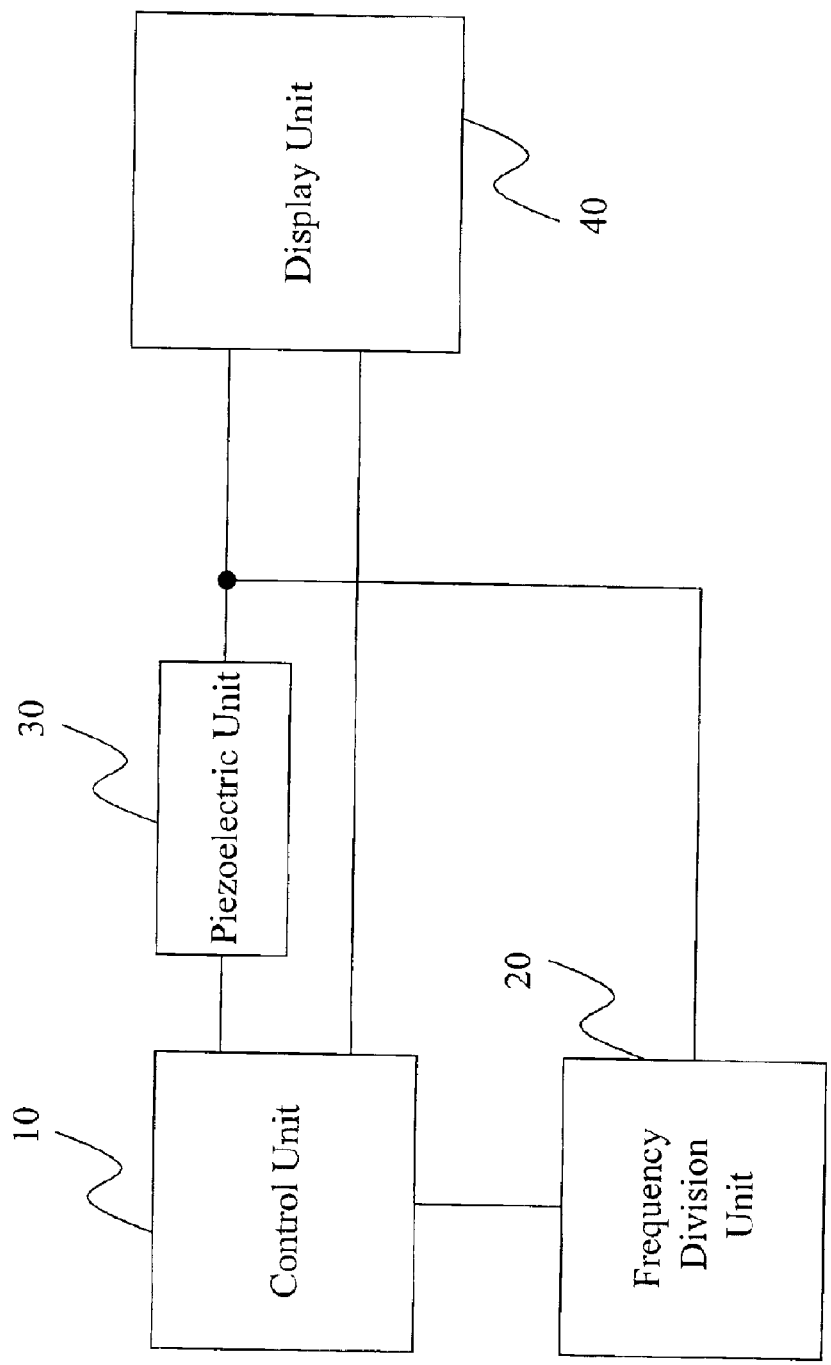
FIG. 1 is a system block diagram of the frequency division type protection device for portable information processing systems according to the invention.

With reference to FIG. 1, the disclosed frequency division type protection device for portable information processing systems uses a frequency division means to provide the necessary voltage for the portable information processing system to function correctly when the voltage has any abnormal activity. It thus protects the data inside the portable information processing system from losses. The frequency division type protection device includes: a control unit 10 and a frequency division unit 20.

The control unit 10 is a control IC (Integrated Circuit) installed in the portable information processing system to control the working status of the system. The frequency division unit is connected to the control unit 10 to detect the voltage of the portable information processing system and, when there is any abnormal activity occurring to the voltage, generates a frequency division voltage for the control unit 10 to function normally. In addition to the abovementioned two units, the invention also contains a piezoelectric unit 30 and a display unit 40. The piezoelectric unit 30 is a piezoelectric transformer that can produce piezoelectricity and is connected with the control unit 10 to generate a voltage for the portable information processing system. The display unit 40 is a CCFL (Cold Cathode Fluorescent Lamp) connected with the piezoelectric unit 30 to display the current status of the disclosed frequency division type protection device.

Figure 2:
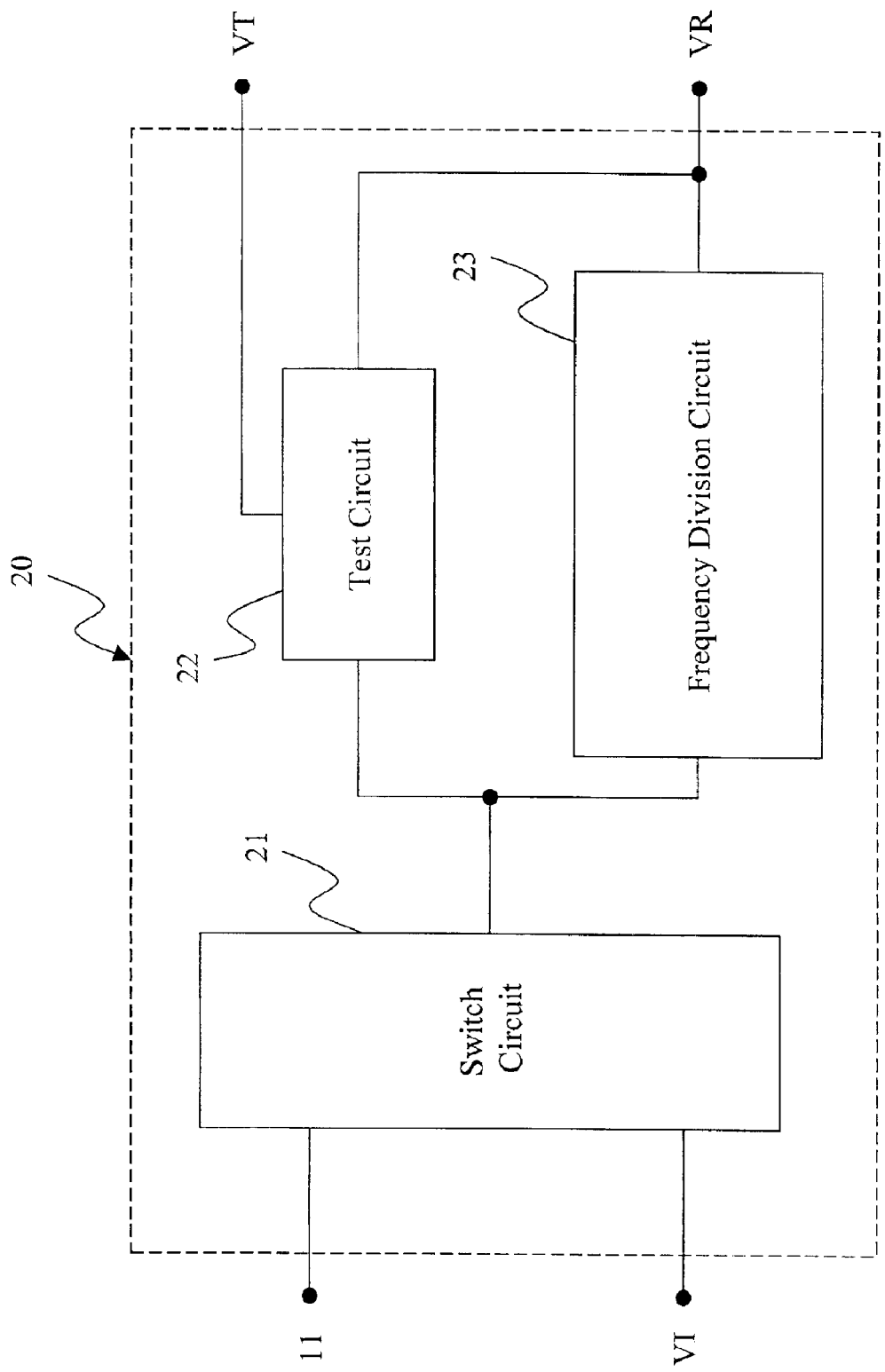
FIG. 2 is a system block diagram of the frequency division unit in FIG. 1.

Let us take a closer look at the frequency division unit 20 with reference to its system block diagram shown in FIG. 2. To achieve the function of frequency division, the frequency division unit 20 includes a switch circuit 21, a test circuit 22 and a frequency division circuit 23. The first input of the switch circuit 21 connects with a voltage input VI and the frequency circuit 23, and the second input of the switch circuit 21 connects with the test circuit 22 to receive the normal voltage at the voltage input terminal and transmits it to the control unit 10. After receiving the switch voltage from the test circuit 22, the frequency division voltage from the frequency division circuit 23 is sent to the control unit 10 for its normal functioning. The first input of the test circuit 22 is coupled to a test voltage VT. The second input of the test circuit is coupled to the reference voltage VR. The test circuit 22 compares the test voltage VT and the reference voltage VR. When the portable information processing system experiences an abnormal voltage activity, the test circuit 22 produces and sends a switch voltage to its output. The frequency division circuit 23 is also coupled to the voltage input VI and divides the frequency of the normal voltage at the voltage input VI when the test circuit 22 produces a switch voltage. The produced frequency division voltage is then transmitted to the switch circuit 21.

Figure 3:
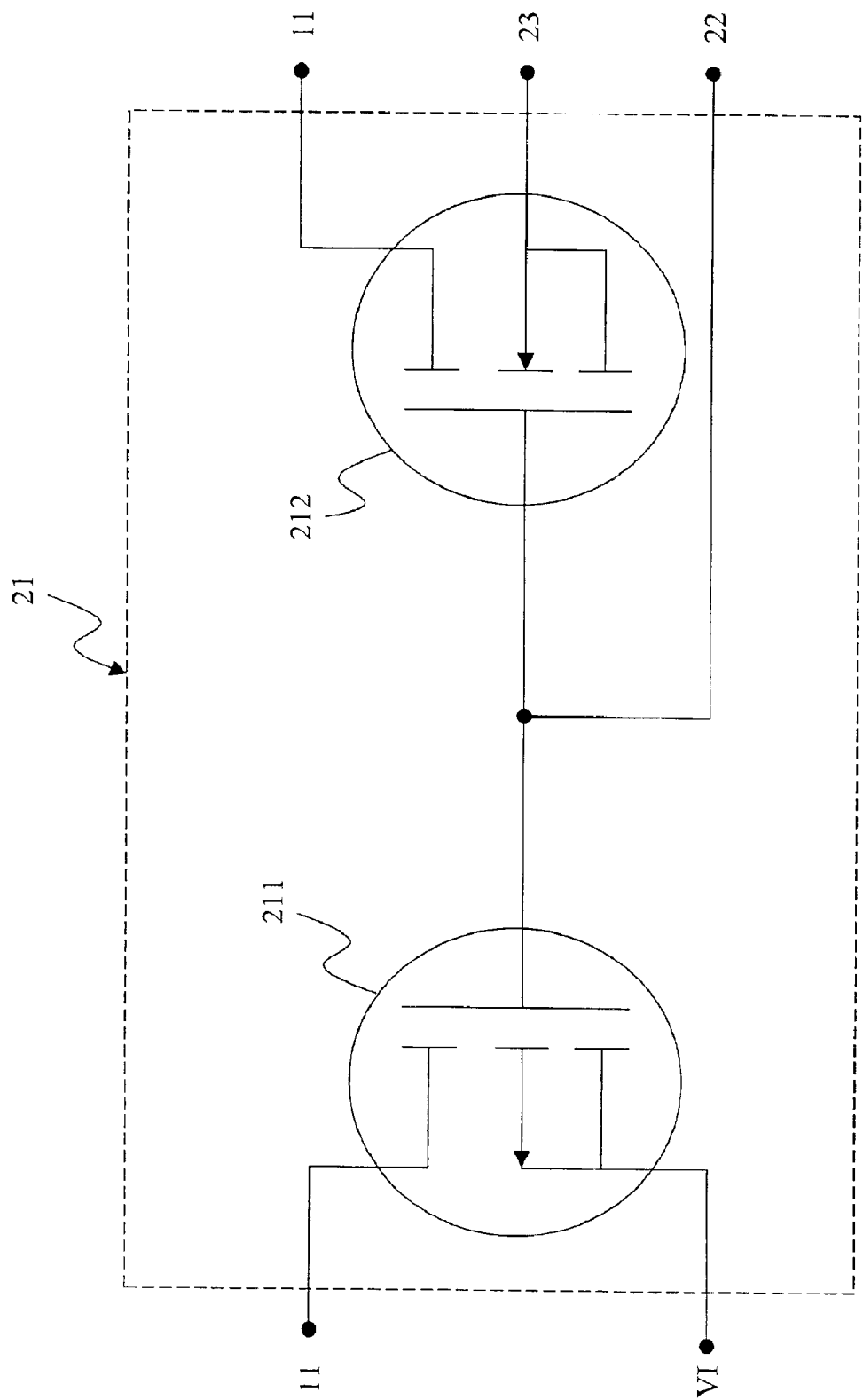
FIG. 3 is a schematic view showing the switch circuit of FIG. 1.

FIG. 3 further explains the switch circuit 21. The switch circuit 21 contains a first switch device 211 and a second switch device 212. The first switch device 211 is an MOS (Metal Oxide Semiconductor) with its first input connecting to the voltage input VI, its second input connecting to the test circuit 22, and its input 11 connects to the control unit 10. Therefore, it can send the normal voltage from the voltage input VI to the control it 10 for its operation. After receiving a switch voltage from the test circuit 22, the first switch device 211 stops the normal voltage transmission to the control unit 10. The second switch device 212 is also an MOS, with its first input connecting to the frequency division circuit 23, its second input connecting to the test circuit 22, and its inputs connecting to the control unit 10. After receiving a switch voltage from the test circuit 22, the second switch device 212 transmits the frequency division voltage from the frequency division circuit 23 to the control unit 10 for its continuous operation.

Figure 4:
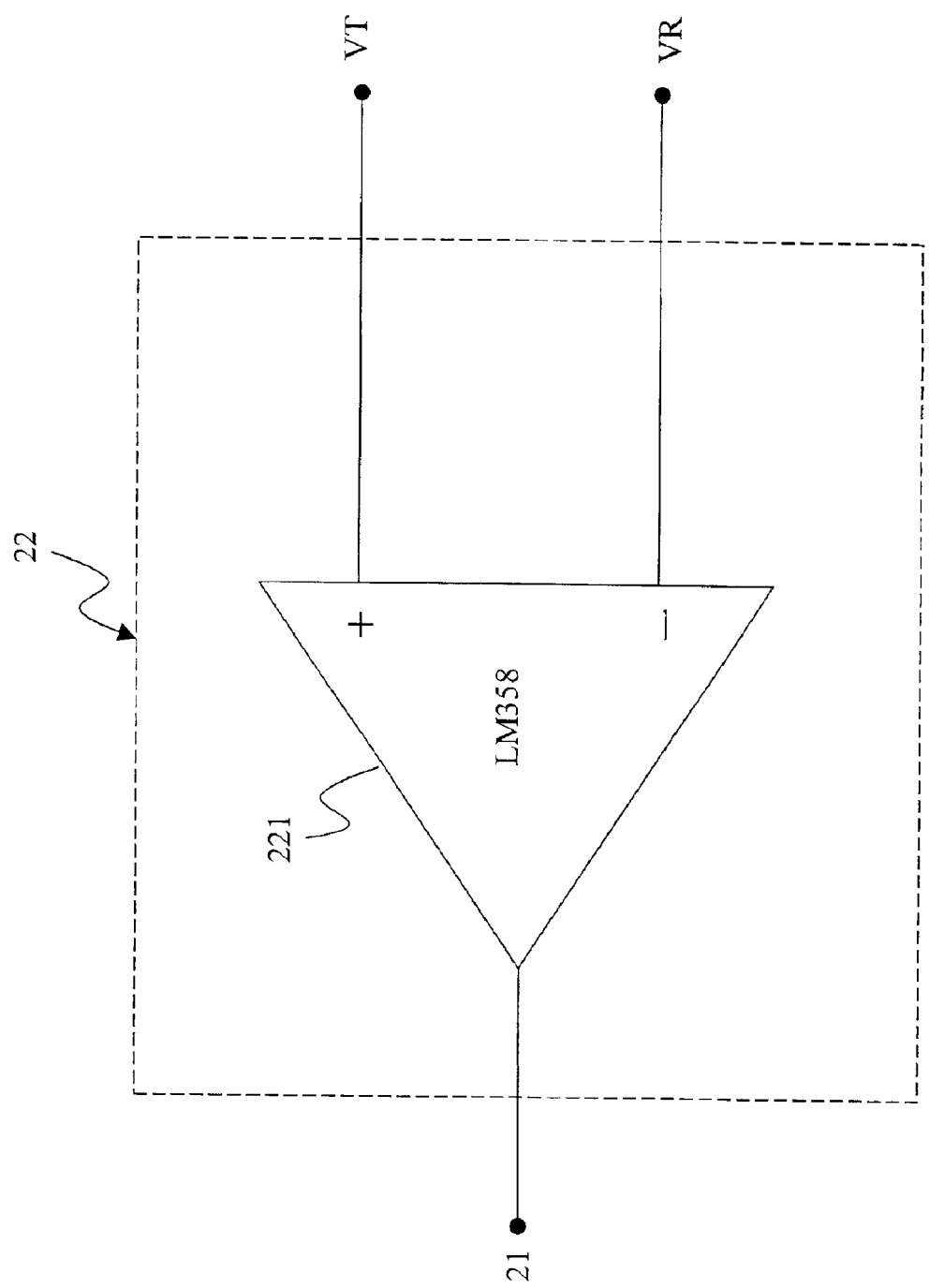
FIG. 4 is a schematic view showing the test circuit of FIG. 1.

As shown in FIG. 4, the test circuit 22 of the invention is a difference amplifier (LM 358) 221. The plus input of the test circuit 22 is connected to a test voltage VT and its negative input to a reference voltage VR to receive and detect the test voltage VT and the reference voltage VR. The result of the operation is sent to the switch circuit 21. The frequency division circuit 23 can also be composed of several single power supply comparators (LM393). When the frequency division circuit 23 receives the switch voltage from the test circuit 22, the frequency division circuit 23 divides the normal voltage of the voltage input VI.

In conclusion, the disclosed frequency division type protection device has the advantage that when the portable information processing system has an abnormal voltage activity due to circuit misjudgment or noise interference, the piezoelectric unit is temporarily stopped from its normal task to protect the system. From the above embodiment, one sees that the frequency division unit provides a frequency division voltage to keep the control unit working so that the integrity of data can be maintained. In comparison with conventional protection circuits for portable information processing systems, the present invention can provide a better protection.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A frequency division type protection device for a portable information processing system to provide a necessary voltage for the portable information processing system to function normally using a frequency division means when an abnormal voltage activity occurs to the portable information processing system, thus protecting the information inside the portable information processing system, the frequency division type protection device being comprised of:

a control unit, which is installed inside the portable information processing system to control the work status of the portable information processing system;

a piezoelectric unit, which is connected with the control unit to produce a voltage for the portable information processing system to function normally;

a frequency division unit, which is connected with the control unit to detect the voltage of the portable information processing system and to produce a frequency division voltage for the control unit to function correctly when an abnormal voltage activity is detected;

a display unit, which is connected with the piezoelectric unit to display the current status of the portable information processing system;

a test circuit, which has a first input coupling to a test voltage and a second input coupling to a reference voltage to compare the test voltage and the reference voltage, and produces a switch voltage when there is an abnormal voltage activity;

a frequency division circuit, which is connected with a voltage input to divide the frequency of a normal voltage when producing the switch voltage and, afterwards, to produce a frequency division voltage; and a switch circuit, which has a first input connecting to the voltage input and the frequency division circuit and a second input connecting to the test circuit to receive and transmit the normal voltage to the control unit, and transmits the frequency division circuit to the control unit after receiving the switch voltage.

2. The portable information processing system of claim 1, wherein the test circuit is a difference amplifier LM358.

3. The portable information processing system of claim 1, wherein the switch circuit comprises:

a first switch device, which has a first input connecting to the voltage input, a second input connecting to the test circuit, and the inputs connecting to the control unit to transmit the normal voltage to the control unit, and stop transmitting the normal voltage when receiving the switch voltage; and a second switch device, which has a first input connecting to the frequency division circuit, a second input connecting to the test circuit, and the inputs connecting to the control unit to transmit the frequency division voltage to the control unit when receiving the switch voltage.

4. The portable information processing system of claim 3, wherein the first switch device is an MOS (Metal Oxide Semiconductor).

5. The portable information processing system of claim 3, wherein the second switch device is an MOS (Metal Oxide Semiconductor).

6. The portable information processing system of claim 1, wherein the frequency division circuit is a composed of a plurality of single power supply comparators LM393.

7. The portable information processing system of claim 1, wherein the display unit is a CCFL (Cold Cathode Florescent Lamp).

8. The portable information processing system of claim 1, wherein the control unit is a control IC (Integrated Circuit).

9. The portable information processing system of claim 1, wherein the piezoelectric unit is a piezoelectric transformer.

10. The portable information processing system of claim 1, wherein the portable information processing system is a laptop computer.

* * * * *